:::: {.cols}
(12) United States Patent
Bangel et al.

(10) Patent No.: US 7,668,819 B2
(45) Date of Patent: Feb. 23, 2010
::::

(54) SYSTEM AND METHOD FOR DATABASE QUERY WITH ON DEMAND DATABASE QUERY REDUCTION

(75) Inventors: Matthew J. Bangel, Poughkeepsie, NY (US); Andrew M. Chang, Manteca, CA (US); James A. Martin, Jr., Endicott, NY (US); Douglas G. Murray, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 11/900,792

(22) Filed: Sep. 13, 2007

(65) Prior Publication Data

US 2008/0010265 A1 Jan. 10, 2008

Related U.S. Application Data

(63) Continuation of application No. 11/034,390, filed on Jan. 11, 2005.

(51) Int. Cl.
*G06F 7/00* (2006.01)
(52) U.S. Cl. .................................. 707/4; 707/3; 707/5
(58) Field of Classification Search ............... 707/3, 707/4, 5
See application file for complete search history.

(56) References Cited

U.S. PATENT DOCUMENTS

| | | | |
|---|---|---|---|
| 5,664,173 A | 9/1997 | Fast | 707/4 |
| 5,742,806 A | 4/1998 | Reiner et al. | 707/3 |
| 6,006,220 A | 12/1999 | Haderle et al. | 707/4 |
| 6,289,334 B1 | 9/2001 | Reiner et al. | 707/3 |
| 6,334,128 B1 | 12/2001 | Norcott et al. | 707/5 |
| 6,496,819 B1 | 12/2002 | Bello et al. | 707/3 |
| 6,581,055 B1 | 6/2003 | Ziauddin et al. | 707/4 |
| 2002/0065863 A1 | 5/2002 | Fruensgaard et al. | 709/100 |
| 2004/0059702 A1 | 3/2004 | Hepner et al. | 707/1 |

*Primary Examiner*—Pierre M Vital
*Assistant Examiner*—Christopher J Raab
(74) *Attorney, Agent, or Firm*—Shelley M. Beckstrand; John Pivnichny

(57) ABSTRACT

A database is queried with on demand database query reduction A query document includes global variables selectively set off by first tags identifying a first global variable as a complete replacement variable and by second tags identifying a second global variable as a complete removal string. An agent is provided for building from the query document an expanded query by replacing any variables set off by first tags with runtime strings, setting off any unions in the query document, and selectively replacing any variables set off by second tags and removing the second tags without replacing variables set off by second tags.

5 Claims, 5 Drawing Sheets

SYSTEM AND METHOD FOR DATABASE QUERY WITH ON DEMAND DATABASE QUERY REDUCTION

This application is a continuation of, and claims priority to, U.S. patent application Ser. No. 11/034,390, filed 11 Jan 2005.

BACKGROUND OF THE INVENTION

1. Technical Field of the Invention

This invention relates to database query, and more particularly to on demand database query reduction using variable replacement and automated unions.

2. Background Art

The Structure Query Language (SQL) can be a very rigid language against which to perform queries. This is intended, for a well structured format for database queries was a purpose of the SQL language. It provides a universal language to perform database scripting that all of the database applications on the market today can utilize and into which an Application Programmers Interface (API) may be provided. Sometimes, however, it is necessary to put a large amount of information together into one data set from any number of source database tables. SQL handles this by providing inner join and union commands, so that data can be merged between tables and different data sets. Yet, in this case, there is a need to insert zeroes where data is not going to be entered, as well as utilize repetitive code just to make certain the correct data is obtained within each union.

In SQL, queries can be configured based on a set of rules and definitions. Programmers deal these days with overwhelming code complexities. SQL requires the syntax components to be very exact.

SUMMARY OF THE INVENTION

A system, program product, and method for querying a database with on demand database query reduction by receiving a query document with global variables selectively set off by first tags identifying a first global variable as a complete replacement variable and by second tags identifying a second global variable as a complete removal string; and building from the query document an expanded query by replacing any variables set off by first tags with runtime strings, setting off any unions in the query document, and selectively replacing any variables set off by second tags and removing the second tags without replacing variables set off by the second tags.

Other features and advantages of this invention will become apparent from the following detailed description of the presently preferred embodiment of the invention, taken in conjunction with the accompanying drawings.

DETAILED DESCRIPTION OF BEST MODE

In accordance with the preferred embodiment of the invention, replacement variables and UNION commands are inserted at run-time to produce a super query from a sub-query when it is necessary to put a large amount of information together into one data set from any number of source database tables. In effect, this reduces hundreds of pages of code into as little as a single page.

Variable replacement has been used widely in programming, but it is only used to replace single variables. In accordance with the preferred embodiments of the present invention, variable replacement is used to build the query itself. The sub-query is a shell which can be added to, deleted from, and modified based on any number of rules or end-user driven processes. If a variable can be different depending on a situation at run-time it can be replaced. This is expanded upon by replacing a query (including symbol tags bracketing the query) if that query can be different at run-time.

In SQL, queries can be configured (that is, are configurable) based on a set of rules and definitions which result in overwhelming code complexities. In the present invention, such complexities are handled by breaking apart sections of the code and simplifying that code. SQL requires the syntax components to be very exact.

Figure 1:
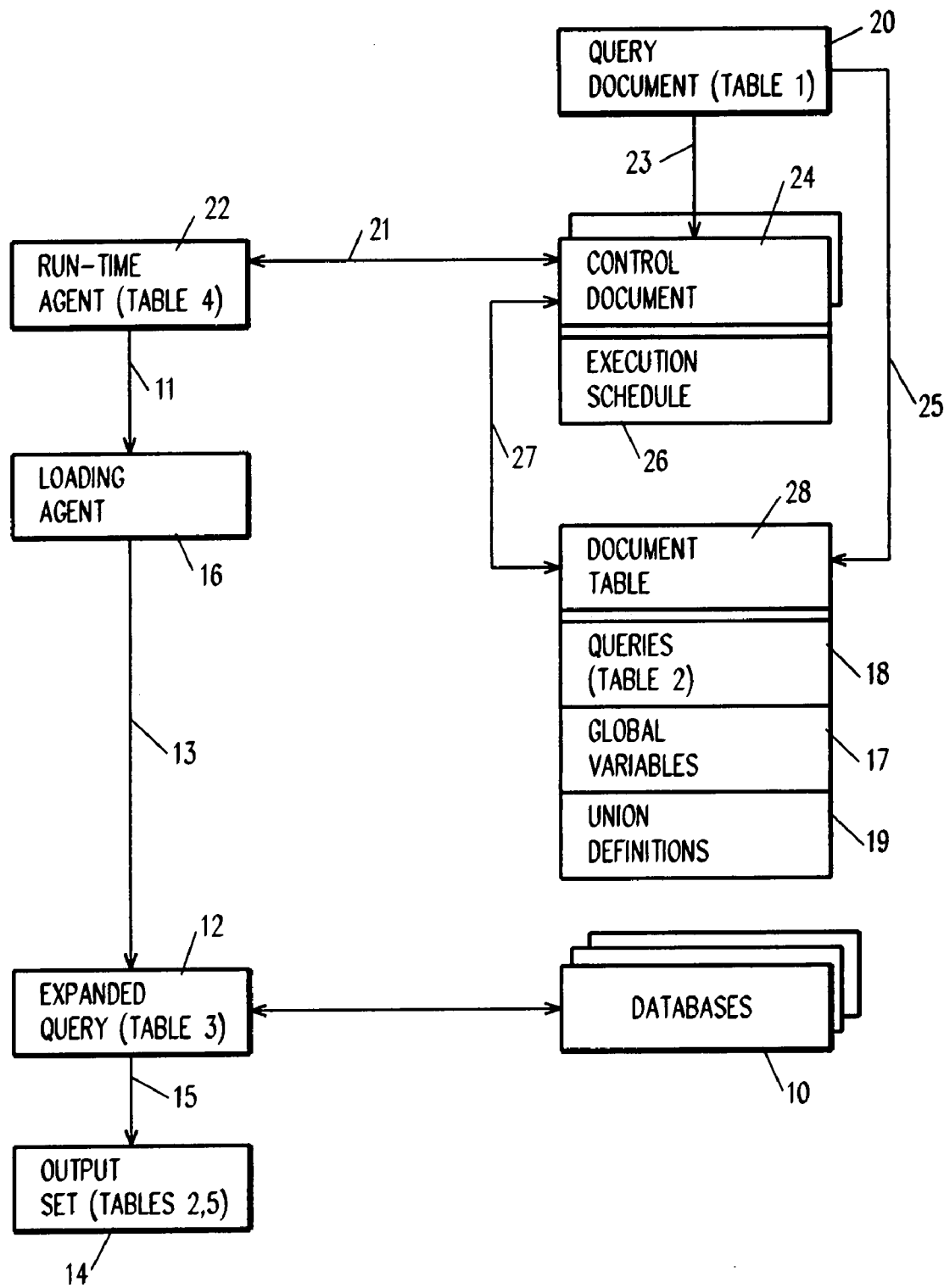
FIG. 1 illustrates various program structures and components for querying a database in accordance with a preferred embodiment of the invention.

Referring to FIG. 1, selected structures and elements pertinent to the preferred embodiment of the invention are set forth. Query document 20 feeds control document 24 and document table 28, as is represented by lines 23 and 25, respectively. Control document 24 includes an execution schedule 26 and accesses document table 28 for information including queries 18, global variables 17, and union definitions 19. Runtime agent 22 monitors control documents for those whose execution schedule 26 indicates that a query is to be executed, whereupon it obtains from control document 24 and feeds to loading agent 16 those definitions, variables, queries needed to build expanded query 12. Expanded query 12 is then executed upon databases 10 to generate output set 14.

Figure 2:
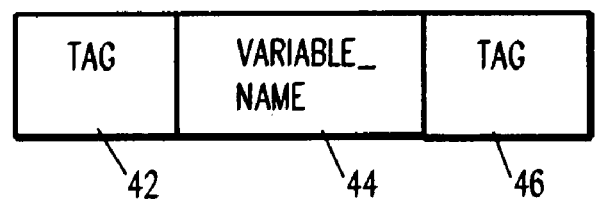
FIG. 2 illustrates the syntax of a variable.

Referring to FIG. 2 in connection with Table 1, the syntax of variable includes a variable_name 44 between tags 42, 46. The tags indicated the type of variable. In the example of Table 1, % tags set off complete replacement variables, and @ tags set off complete removal strings.

Figure 3:
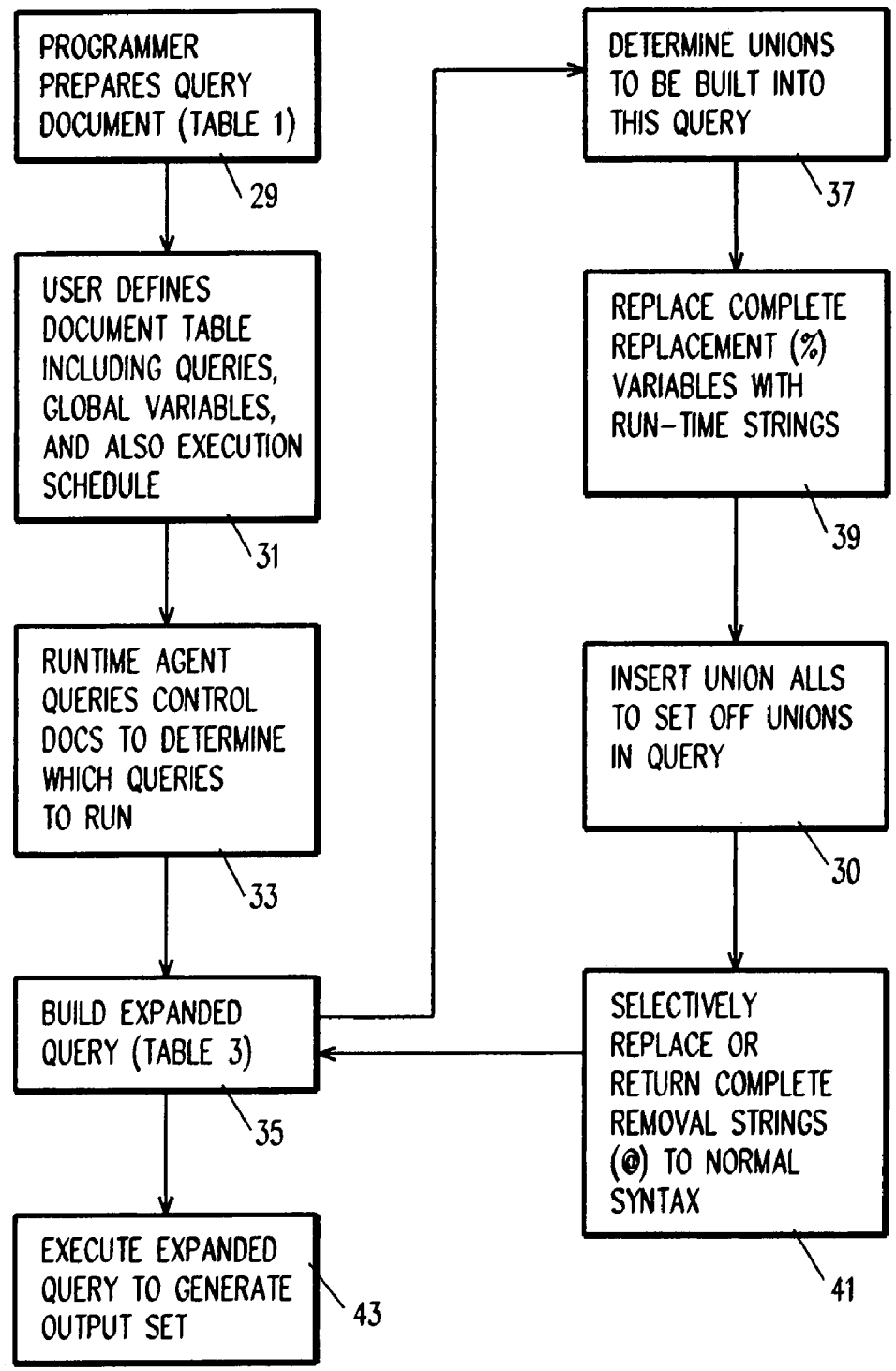
FIG. 3 is a high level flow diagram illustrating the steps of a preferred embodiment of the invention for querying a database.

Referring to FIG. 3, the database query of a preferred embodiment of the invention proceeds as follows. In step 29, a programmer prepares a query document 20, such as is illustrated in Table 1. This query document 20 is a generic document that will be modified in subsequent steps to form an expanded query 12, such as is illustrated in Tables 2 and 5, as will be more fully described hereafter.

In step 31, a user, which may be the programmer or some other individual, specifies the execution schedule 26 and defines in document table 28 specific queries 18 for which an output set 14 is desired. Query document 20 specifies global variables 17, and specific queries 18 and resulting union definitions 19 are derived from user input in this step 31 and from query document 20.

In step 33, runtime agent 22 queries control documents 24 to determine which queries to run, and in step 35 calls and provides to loading agent 16 the queries 18, global variables 17 and union definitions 19 required in step 35 to build expanded query 12.

In step 43, expanded query 12 is executed against databases 10 to build output set 14, as is illustrated in Table 2 and, for a different query, in Table 5.

Steps 37-41 expand on step 35. In step 37 unions to be built into this query are determined, and in step 39 complete replacement variables are replaced with run-time strings. In the syntax of the present example, these are strings or variables 44 set off by % tags 42, 46.

In step 30, UNION ALLs are inserted to set off unions in the query so that aggregate functions can be evaluated based on specific selection criteria. In step 41, complete removal strings 44 are selectively replaced or their @ tags 42, 46 removed to return the variable string 44 to normal syntax.

Figure 4:
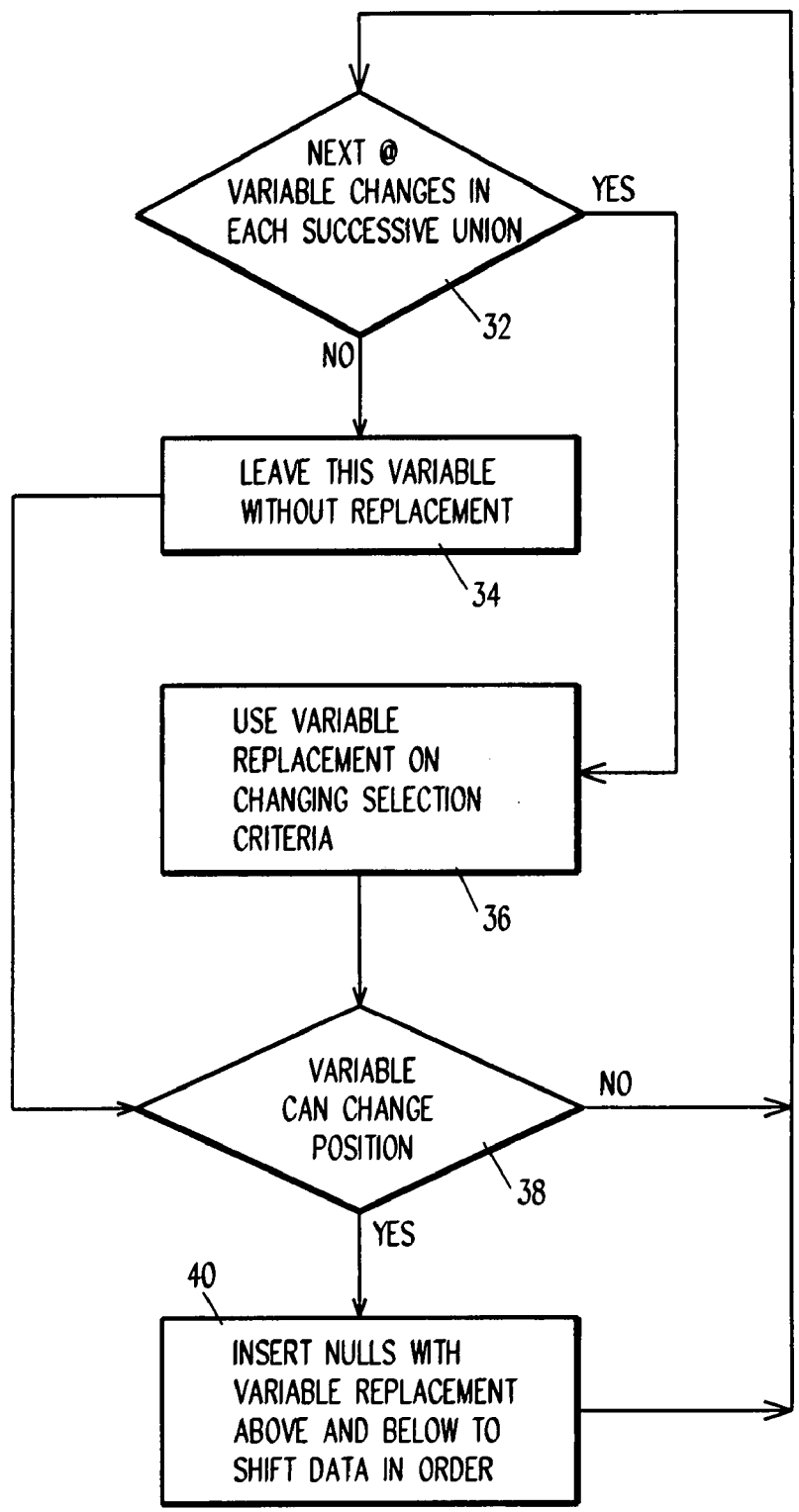
FIG. 4 is a flow diagram illustrating the step of a preferred embodiment of the invention for executing the selective replace step 41 of FIG. 3.

Referring to FIG. 4, step 41 is further refined. In step 32, a next variable is examined to see if it changes in every successive union. If not, in step 34 this variable is left hard-coded with no variable replacement. If so, in step 36 variable replacement is done, for example, on changing selection criteria such as date clauses. In step 38 this next variable is examined to see if it can change position. If so, in step 40 NULL values or zeroes are inserted along with variable replacement above and below so that the data can be shifted in order. When the union is complete, all the data resides in one data set.

Run time agent 22 and/or loading agent 16, with reference to control document 24, provides a system of subroutines created to replace or remove variables 17 based on the variable name. This is executed in steps 39 and 41 at run-time, and can be done with or without end-user interaction based on the requirement of the overall end product.

In the example query of Table 1, which utilizes several aggregate functions, the variables inside of %variable_name% are complete replacement variables that are replaced with any desired string at run-time by an agent. The variables inside @variable_name@ indicate complete removal strings which, at run time, if conditions exist that require a line to be removed it is, otherwise the @ tags (or symbols) are removed and the line thus returned to normal SQL syntax.

SQL is used to create queries using the following:

| | |
|---|---|
| SELECT | identifies field to grab |
| FROM | table from which to grab fields |
| WHERE | used to determine which data to be selected from field |
| GROUP BY | output sort order |
| ORDER BY | order of columns in output display. |

In SQL, a UNION is an operation that combines the results of two subselects, and is often used to merge lists of values obtained from several tables. Place holders are used in the columns of the result returned from SQL so that sums do not get overwritten in the output. In order to merge, for example, values from three tables A, B, and D, into one table E, two unions are required.

First Union: Merge tables A and B, forming table C.
Second Union: Merge tables C and D, forming table E.

Table 1 illustrates a set of SQL code that utilizes the variable replacement strategy of the preferred embodiment of the invention. In this example, ACCOUNT_DESC is a table name, TA is an assignment variable, %variable_name% represents a string to be replaced later in the code, %INSERTZEROABOVE% indicates that a runtime determined number of NULL values is to be inserted above, %INSERTZEROBELOW% indicates that a runtime determined number of NULL values is to be inserted below.

TABLE 1

VARIABLE REPLACEMENT STRATEGY EXAMPLE

| | |
|---|---|
| 1 | SELECT TA.ACCTGRP_ID, TA.ORIG_LOC_CD, TA.SERVICE_TYP_CD, |
| 2 | TA.ACCOUNT_ID, AG.ACCOUNT_DESC |
| 3 | //   Insert a runtime determined number of NULL |
| 4 |      values above and below SUM lines. |
| 5 | %INSERTZEROABOVE% |
| 6 | ,SUM(TA.USAGE_QTY) |
| 7 | ,SUM(TA.TOT_CHRG_AMT) |
| 8 | %INSERTZEROBELOW% |
| 9 | //   Automatic replacement of SCHEMA identifiers; the |
| 10 |     %YEARCLAUSE% and %MONTHCLAUSE% are |
| 11 |     used later to manipulate date searches. |
| 12 | FROM %SCHEMA%.%TABLE% TA, %SCHEMA%.ACCOUNT AG |
| 13 | WHERE TA.ACCOUNT_ID = AG.ACCOUNT_ID |
| 14 | AND TA.CONTROL_GROUP_CD = AG.CONTROL_GROUP_CD |
| 15 | AND TA.SERVICE_CD = 'LBR' |
| 16 | AND %YEARCLAUSE% %MONTHCLAUSE% |
| 17 | GROUP BY T.ACCTGRP_ID |
| 18 | ,TA.ORIG_LOC_CD |
| 19 | ,TA.SERVICE_TYP_CD |
| 20 | ,TA.ACCOUNT_ID |
| 21 | ,AG.ACCOUNT_DESC |
| 22 | //   Replacement ORDER BY command is sometimes needed, |
| 23 |     sometimes not needed. The 1,2,3,4 in the ORDER BY |
| 24 |     command at line 26 refers back to the first four of the |
| 25 |     five variables in the SELECT clause at line 1 of this |
| 26 |     Table. |
| 27 | @ORDER BY 1,2,3,4@ |

The code of Table 1 is manipulated by a runtime agent and variables are inserted dynamically into the code to build a large-scale, syntax complete query.

Table 2 illustrates a desired result set, with lines 3 and 4 representing a first result, lines 5 and 6 a second result, and lines 7 and 8 the third result. Place holders 0,0 will be used (see Table 3) to move down each result after the first by two lines from the previous result.

TABLE 2

RESULT SET

| | |
|---|---|
| 1 | TA.ACCTGRP_ID, TA.ORIG_LOC_CD, TA.SERVICE_TYP_CD, |
| 2 | TA.ACCOUNT_ID, AG.ACCOUNT_DESC |
| 3 | ,FullYearUSAGE_QTY |
| 4 | ,FullYearTOT_CHRG_AMT |
| 5 | ,YearToDateUSAGE_QTY |
| 6 | ,YearToDateTOT_CHRG_AMT |
| 7 | ,CurrentMonthUSAGE_QTY |
| 8 | ,CurrentMonthTOT_CHRG_AMT |

Table 3 illustrates the expansion of the code of Table 1 in accordance with the process of the invention. Prior to the present invention, a programmer would have to write and manage this code of Table 3. By this invention, the programmer is able to visualize by reference to Table 1 what he is trying to accomplish without having to build the expanded version in Table 3 himself—that is now done by the runtime agent.

The code of Table 3 presents an example of three unions according to the result set of Table 2. Table 3 lines 2-16 represent an expansion of Table 1, lines 1-21, to generate result set (Table 2) output lines 3 and 4, with Table 1 line 26 ORDER BY ignored, and with the following variable replacements:

| | |
|---|---|
| %INSERTZEROABOVE% | replaced by null |
| %INSERTZEROBELOW% | replaced by ,0,0,0,0 |
| %SCHEMA% | replaced by DBADMIN |
| %TABLE% | replaced by TABLE1 |
| %YEARCLAUSE% | replaced by TA.YEAR = 2003 |
| %MONTHCLAUSE% | replaced by null |

Table 3 lines 18-33 sum different data to yield the result set lines 5 and 6 for the year to date, depending upon the WHERE clause at lines 25-28, with the following variable replacements:

| | |
|---|---|
| %INSERTZEROABOVE% | replaced by ,0,0 |
| %INSERTZEROBELOW% | replaced by ,0,0 |
| %SCHEMA% | replaced by DBADMIN |
| %TABLE% | replaced by TABLE1 |
| %YEARCLAUSE% | replaced by TA.YEAR = 2003 |
| %MONTHCLAUSE% | replaced by TA.MONTH <= 7 |

Table 3 lines 35-50 sum yet different data, to yield the result set lines 7 and 8 for the current month, depending upon the WHERE clause at lines 41-44, with the following variable replacements:

| | |
|---|---|
| %INSERTZEROABOVE% | replaced by ,0,0,0,0 |
| %INSERTZEROBELOW% | replaced by null |
| %SCHEMA% | replaced by DBADMIN |
| %TABLE% | replaced by TABLE1 |
| %YEARCLAUSE% | replaced by TA.YEAR = 2003 |
| %MONTHCLAUSE% | replaced by TA.MONTH = 7 |

During the three executions of step 40 required in this example, the expansion of %INSERTZEROBELOW% at Table 1, line 8 into 0,0,0,0 at line 6 of this Table 3 indicates that the bottom four slots are not utilized, and represent place holders; the expansion of %INSERTZEROABOVE% and %INSERTZEROBELOW% of Table 1 lines 5 and 8, respectively, into 0,0 at Table 3 lines 20 and 23, respectively, indicate that the top two slots and the bottom two slots are not utilized; and the expansion of %INSERTZEROABOVE% of Table 1 line 5 into 0,0,0,0 at line 37 of Table 3 indicates that the top four slots are not used.

TABLE 3

RUNTIME EXPANSION (VARIABLES REPLACED) OF TABLE 1

```
1   //   Following code is an example with three unions.
2   SELECT T.ACCTGROP_ID, TA.ORIG_LOC_CD, TA.SERVICE_TYP_CD,
3   TA.ACCOUNT_ID, AG.ACCOUNT_DESC
4   ,SUM(TA.USAGE_QTY)
5   ,SUM(TA.TOT_CHRG_AMT)
6   ,0,0,0,0
7   FROM DBADMIN.TABLE1 TA, DBADMIN.ACCOUNT AG
8   WHERE TA.ACCOUNT_ID = AG.ACCOUNT_ID
9   AND TA.CONTROL_GROUP_CD = AG.CONTROL_GROUP_CD
10  AND TA.SERVICE_CD = 'LBR'
11  AND TA.YEAR = 2003
12  GROUP BY TA.ACCTGRP_ID
13   ,TA.ORIG_LOC_CD
14   ,TA.SERVICE_TYP_CD
15   ,TA.ACCOUNT_ID
16   ,AG.ACCOUNT_DESC
17  UNION ALL
18  SELECT TA.ACCTGRP_ID, TA.ORIG_LOC_CD, TA.SERVICE_TYP_CD,
19  TA.ACCOUNT_ID, AG.ACCOUNT_DESC
20  ,0,0
21  ,SUM(TA.USAGE_QTY)
22  ,SUM(TA.TOT_CHRG_AMT)
23  ,0,0
24  FROM DBADMIN.TABLE1 TA, DBADMIN.ACCOUNT AG
25  WHERE TA.ACCOUNT_ID = AG.ACCOUNT_ID
26  AND TA.CONTROL_GROUP_CD = AG.CONTROL_GROUP_CD
27  AND TA.SERVICE_CD = 'LBR'
28  AND TA.YEAR = 2003 AND TA.MONTH <= 7
29  GROUP BY TA.ACCTGRP_ID
30   ,TA.ORIG.LOC.CD
31   ,TA.SERVICE_TYP_CD
32   ,TA.ACCOUNT_ID
33   ,AG.ACCOUNT_DESC
34  UNION ALL
35  SELECT TA.ACCTGRP_ID, TA.ORIG_LOC_CD, TA.SERVICE_TYP_CD,
36  TA.ACCOUNT_ID, AG.ACCOUNT_DESC
37  ,0,0,0,0
38  ,SUM(TA.USAGE_QTY)
39  ,SUM(TA.TOT_CHRG_AMT)
40  FROM DBADMIN.TABLE1 TA, DBADMIN.ACCOUNT AG
41  WHERE TA.ACCOUNT_ID = AG.ACCOUNT_ID
42  AND TA.CONTROL_GROUP_CD = AG.CONTROL_GROUP_CD
43  AND TA.SERVICE_CD = 'LBR'
44  AND TA.YEAR = 2003 AND TA.MONTH = 7
45  GROUP BY TA.ACCTGRP_ID
46   ,TA.ORIG_LOC_CD
```

TABLE 3-continued

RUNTIME EXPANSION (VARIABLES REPLACED) OF TABLE 1

| | |
|---|---|
| 47 | ,TA.SERVICE_TYP_CD |
| 48 | ,TA.ACCOUNT_ID |
| 49 | ,AG.ACCOUNT_DESC |
| 50 | ORDER BY 1,2,3,4 |

Runtime agent 22 requests the queries, as is illustrated by the following decision tree:

1. An agent 22 wakes up every night and searches for control documents 24 to be run that night.
2. If it finds a document 24 to run, it executes a generic loading agent 16 with the document 24, otherwise it simply quits.
3. Upon a load, the control document 24 feeds the necessary information to the runtime agent 22, that information including which queries 18 are to be executed.

Thus, agent 22 is driving the whole process. It executes what is scheduled, and in doing so it (itself, or by loading agent 16) builds the queries 12 being executed. Thus, the agent 22 processes the query in Table 1 (query document 20)→Table 3 (expanded query 12)→Table 2 (output set 14). Table 4 is a simple pseudo code example of this process.

TABLE 4

RUNTIME AGENT EXAMPLE

```
`---- Runtime Agent
Set control_docs = SearchForScheduledQueries
If control_docs.Count <> 0 Then
    Forall n In Control_docs
        Call ProcessQueryExecution(n)
    End Forall
End If
`---- End Runtime Agent
`---- ProcessQueryExecution Routine
Set query = SubPercentVariables(control_doc.Query(0))
Forall s In control_doc.NumberOfUnions(0)
    Set query = AddUnion(query)
    If s = LastUnion Then
        Set query = SubAtVariables(query)
    Else
        Set query = RemoveAtVariables(query)
    End If
End Forall
`---- END ProcessQueryExecution Routine
```

In accordance with the preferred embodiment of the invention, agent 22 is used for the expansion of a programmer written query 20 in the form of Table 1 into the form of Table 3. Similarly, a reducing agent may be provided (not shown), using a similar process, for reducing a query 12 in the form of Table 3 into a query 20 of the form of Table 1.

In the example of Tables 1-3, two unions are provided. However, this is arbitrary. At runtime there may only be one union necessary, or even none. This is decided by the control (aka mapping) documents 24.

Table 2 is a pseudocode representation of a desired result 14. There also exists a generic subroutine for building the query in Table 3 that uses information gathered by the agent 22 at runtime to generically piece the query together. For example, there are control documents 24 which are used to schedule agent execution. On some schedule, or on demand, a database tool (agent 22) finds one of these control documents 24 ready for execution. The control document 24 serves a variety of purposes. One purpose is to provide information on the database sources 10. In that document 24 there is a field for source database schema, and its value is set, in this example, by an administrator (not necessarily a programmer) to DBADMIN. This same control document 24 has information on which queries 18 need to be expanded and executed for a successful run. It then grabs these queries (which are Table 2-type documents) and begins inserting values (steps 39, 41) into it until they become complete (Table 3 is an example) and then they are executed.

Variable replacements are done in many ways in processing a Table 1 into a Table 3 via an agent 22. Table 2 is a representation of what data is to be received in all slots when finished. This must be known at runtime to make the final query of Table 3. The actual replacement variables 17 come from mappings within the tool, and runtime values such as, the type of query being performed and the date/time when the agent is running.

A slot generally refers to a portion of the output set 14. Output data is a set of rows having multiple data entries for each column in a table. So, a slot refers to a single column within a set of output data (Table 5). For example, for the following data, Num1 is referred to as an output slot.

TABLE 5

OUTPUT SET EXAMPLE

| Name | Serial | Num1 | Num2 |
|---|---|---|---|
| Matt | ###### | 15 | 20 |
| Peter | &&&&&& | 20 | 10 |

Advantages Over the Prior Art

It is an advantage of the present invention that there is provided an improved system and method for on demand database query reduction using variable replacement and automated unions.

Alternative Embodiments

Figure 5:
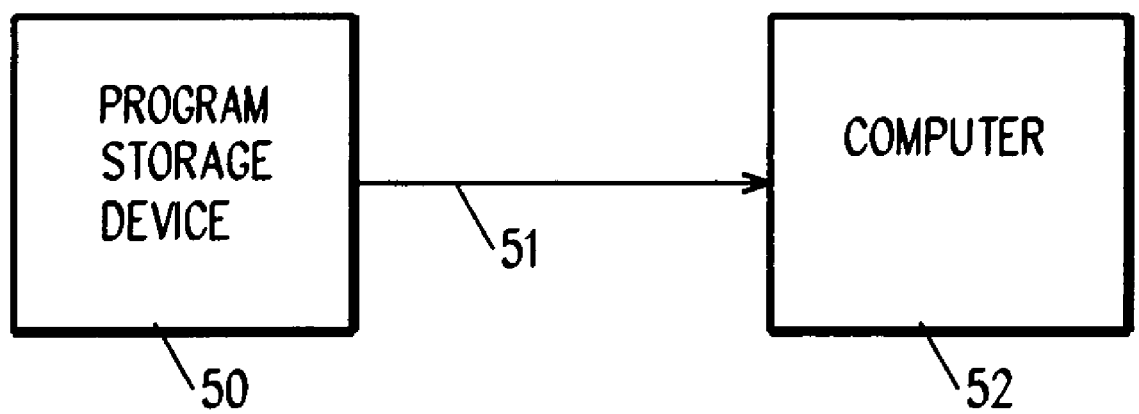
FIG. 5 is a high level system diagram illustrating a program storage device readable by a machine, tangibly embodying a program of instructions executable by a machine to perform method steps for querying a database.

It will be appreciated that, although specific embodiments of the invention have been described herein for purposes of illustration, various modifications may be made without departing from the spirit and scope of the invention. Referring to FIG. 5, in particular, it is within the scope of the invention to provide a computer program product or program element, or a program storage or memory device 50 such as a magnetic or optical wire, tape or disc, or the like, for storing signals readable by a machine as is illustrated by line 51, for controlling the operation of a computer 52 according to the method of the invention and/or to structure its components in accordance with the system of the invention.

Further, each step of the method may be executed on any general purpose computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for managing query creation for querying a database with on demand database query reduction by selectively substituting, replacing, and removing specified variables within a sub-query before they are combined into an expanded query, comprising:

executing a run-time agent in accordance with a first execution schedule to generate dynamic content by accessing control documents to find a control document ready for execution, with a control document including a user-adjustable second execution schedule controlling when final content is created, and, responsive to said second execution schedule, said run-time agent determining when to run a query document;

said query document including global variables selectively bracketed by first tags identifying a first global variable as a complete replacement variable and by second tags identifying a second global variable as a complete removal string, a global variable being a variable which represents a quantity that is available to be modified by a user prior to runtime, said global variables being code definitions of a sub-query that are applied to form a master query and are manipulated by a substitution and replacement strategy to eventually form new content to a coded subquery, said run-time agent being a segment of code separate from said control document;

building from said query document an expanded query by replacing any variables set off by said first tags with runtime strings, and setting off any unions in said query document, selectively, for each set of second tags, for replacing variables in said string set off by said second tags, or removing said second tags without replacing variables set off by said second tags to restore said string set off by said second tags to normal syntax.

2. The method of claim 1, further comprising:

determining if a next given variable changes in each successive union and, if so, removing said second tags to leave this next given variable without replacement; and, if not, replacing said next given variable based on changing selection criteria.

3. The method of claim 2, further comprising:

determining if said next given variable can change position in an output set and, if so, inserting nulls with variable replacement selectively above and below to shift output data in order.

4. The method of claim 1, further comprising:

building from said query document and user input a control document specifying execution schedule, queries, global variables and union definitions.

5. The method of claim 4, further comprising:

executing a runtime agent to monitor said control documents for a query to be run, and upon identifying such a query for building and executing said expanded query.

* * * * *